(12) United States Patent
Chew et al.

(10) Patent No.: US 6,696,832 B2
(45) Date of Patent: Feb. 24, 2004

(54) METHOD AND APPARATUS FOR TESTING TRANSDUCER HEADS IN MAGNETIC STORAGE SYSTEMS

(75) Inventors: Victor W K Chew, Singapore (SG); Edward Y K Hew, Singapore (SG); David K L Loh, Singapore (SG); Myint Ngwe, Singapore (SG); Wong Hon Leong, Singapore (SG); Say Kwee Teck, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/261,010

(22) Filed: Sep. 30, 2002

(65) Prior Publication Data

US 2003/0184286 A1 Oct. 2, 2003

Related U.S. Application Data

(60) Provisional application No. 60/369,293, filed on Apr. 2, 2002.

(51) Int. Cl.$^7$ .................... G11B 5/455; G01R 33/12
(52) U.S. Cl. ........................... 324/210; 360/31
(58) Field of Search ................. 324/210, 212; 360/6, 25, 31, 53

(56) References Cited

U.S. PATENT DOCUMENTS

| | | | |
|---|---|---|---|
| 5,426,537 A | * 6/1995 | Yeh et al. | 360/46 |
| 5,867,334 A | * 2/1999 | Soichi et al. | 360/68 |
| 6,128,146 A | 10/2000 | Ngo | 360/46 |
| 6,215,607 B1 | 4/2001 | Ngo | 360/46 |
| 6,246,269 B1 | 6/2001 | Schuler et al. | 327/110 |
| 6,246,533 B1 | 6/2001 | Davis et al. | 360/68 |
| 6,297,921 B1 | 10/2001 | Price, Jr. et al. | 360/68 |
| 6,442,705 B1 | * 8/2002 | Lamberts | 714/2 |

\* cited by examiner

Primary Examiner—Gerard R. Strecker
(74) Attorney, Agent, or Firm—Westman, Champlin & Kelly, P.A.

(57) ABSTRACT

An apparatus and associated testing method for identifying void heads in magnetic storage systems in which a first bit error rate is determined using data written at a first overshoot amount. A second bit error rate is determined using data written at a second rate current in a second overshoot amount. A physically damaged transducer head is identified based upon a comparison of the first bit error rate to the second bit error rate.

22 Claims, 5 Drawing Sheets

METHOD AND APPARATUS FOR TESTING TRANSDUCER HEADS IN MAGNETIC STORAGE SYSTEMS

CROSS-REFERENCE TO RELATED APPLICATION

This application claims priority from U.S. Provisional Application 60/369,293 filed on Apr. 2, 2002.

FIELD OF THE INVENTION

The present invention relates generally to magnetic storage systems, more particularly, the present invention relates to testing transducer heads used in magnetic storage systems.

BACKGROUND OF THE INVENTION

Magnetic storage systems, such as magnetic disc storage systems, are commonly used to store digital information. There has been an ongoing effort to reduce the size of such magnetic storage systems while increasing their storage capacity. This has led to components which are smaller yet which must provide ever increasing performance.

The trend toward smaller component size and increased component performance has resulted in an increased likelihood that a component could fail. Early detection of potential failure, preferably during manufacture of the storage system, can increase the reliability of those system products which are placed into use. One type of failure is related to the transducer heads used in such magnetic storage systems. Transducer heads are used to read and write information on a magnetic storage medium. During the manufacture of a transducer head, a top pole of the head can be damaged by various chemicals and processing steps used during fabrication. This type of damage to the top pole is referred to as a "void". Voids in the top pole can result in an increase in the number of errors written to and read back from data stored on the storage medium. Storage systems in which the top pole of a head has a void are particularly prone to errors when the temperature is below ambient temperature.

One way to detect transducer heads having top pole voids such that they can be discarded and removed from the manufacturing process is by visual inspection of the head using an electron microscope. However, visual inspection is time consuming and labor intensive and greatly slows down the manufacturing process. Another test which can be used to identify void heads is by testing the Bit Error Rate (BER) of the storage system at a temperature below ambient temperature. (Bit error rate is a ratio between a total number of errors read back and the total number of bits stored on a medium.) However, such a temperature test requires the storage device to be cooled and is also time consuming and labor intensive.

The present invention provides a solution to this and other problems and offers other advantages over the prior art.

SUMMARY OF THE INVENTION

The present invention relates to a method and apparatus for identifying magnetic transducers having voids in the top pole which solves the above mentioned problem.

In accordance with one embodiment of the invention, a testing method and apparatus are provided in which a first bit error rate is determined for data written at a first overshoot amount. A second bit error rate is determined for data written at a second overshoot amount. A void in a top pole of a transducer head is identified by a comparison of the first bit error rate and the second bit error rate.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
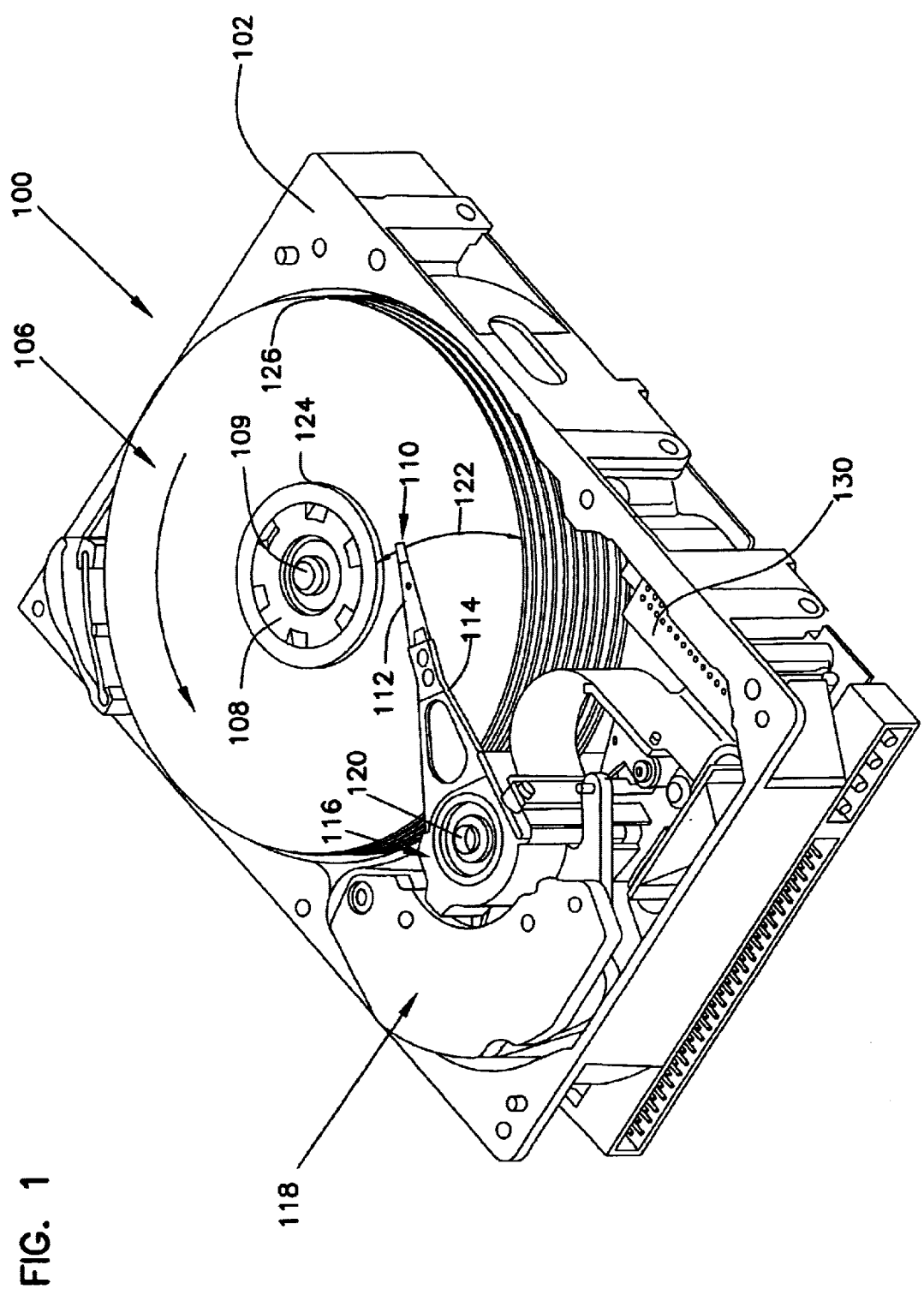
FIG. 1 is an isometric view of a disc drive.

Referring now to FIG. 1, an isometric view of a disc drive 100 is shown which includes a transducer head of the type which the present invention is useful in testing. The same reference numerals are used in various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes one or more individual discs, which are mounted for rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. Slider 110 carries a transducer head 180 shown in FIGS. 2A, 2B and 2C. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2A:
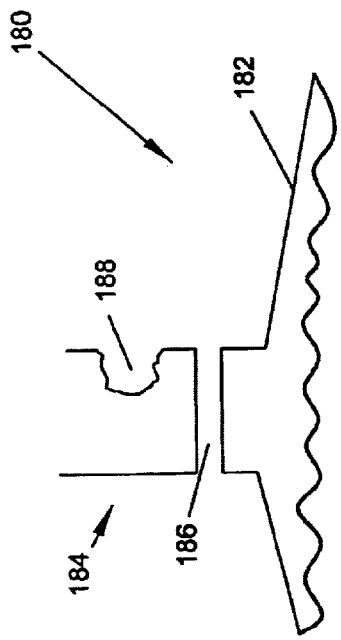
FIGS. 2A, 2B and 2C are front plan views of a transducer head showing "voids" in the top pole.
Figure 2B:
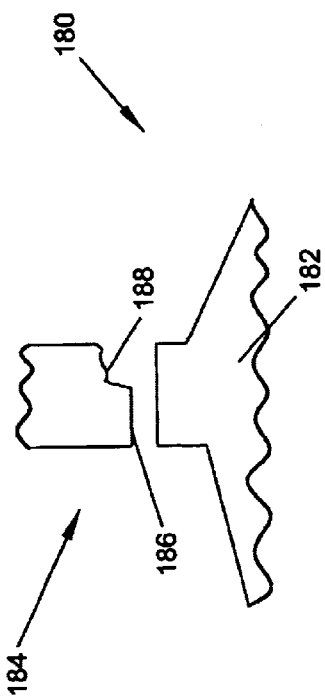
Figure 2C:
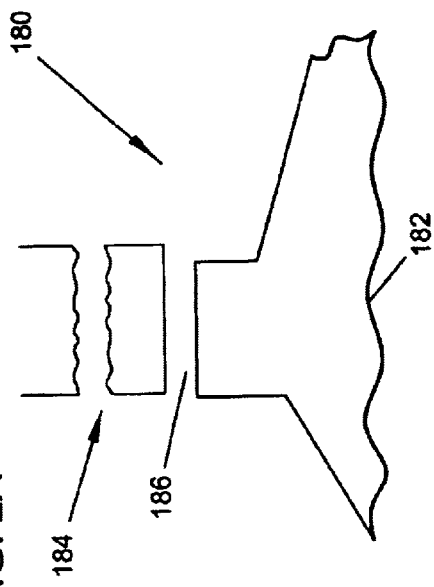

FIGS. 2A, 2B and 2C are front plan views of a transducer head 180 which illustrate examples of "voids" of the type which the present invention is capable of detecting. The numbering in FIGS. 2A, 2B and 2C is the same. FIGS. 2A–2C show transducer head 180 having a lower pole 182 and a top pole 184. Top pole 184 is separated from lower pole 182 by a gap 186. Typically, magnetic information is written onto the storage medium by inducing a magnetic flux across gap 186 by applying a current through a coil associated with the transducer head 180. The process can be reversed and used to sense the presence of magnetic flux on the storage medium if the transducer head 180 is configured for inductive read back. Alternatively, a magneto-resistive sensor element (not shown) associated with transducer head 180 can be used for reading back information.

Examples of a void 188 in top pole 184 are illustrated in FIGS. 2A, 2B and 2C. The void can be across the entire top pole width as illustrated in FIG. 2A or just partially across the width as illustrated in FIG. 2B. FIG. 2C illustrates a void 188 which is adjacent the gap 186 and reduces the width of the top pole 184 at the gap 186.

As discussed in the background section, voids such as those illustrated in FIGS. 2A–2C, cause an increase in the number of errors when reading information back from the storage medium. Such errors typically appear when the drive is used at temperatures below ambient temperature. The detection and elimination of such heads during the manufacturing process can eliminate such errors during operation of the drive. However, visually inspecting transducer heads for the presence of voids is time consuming. Further, such visual inspection may not identify all those heads which have voids, or may misidentify functional heads as being unacceptable.

Figure 3:
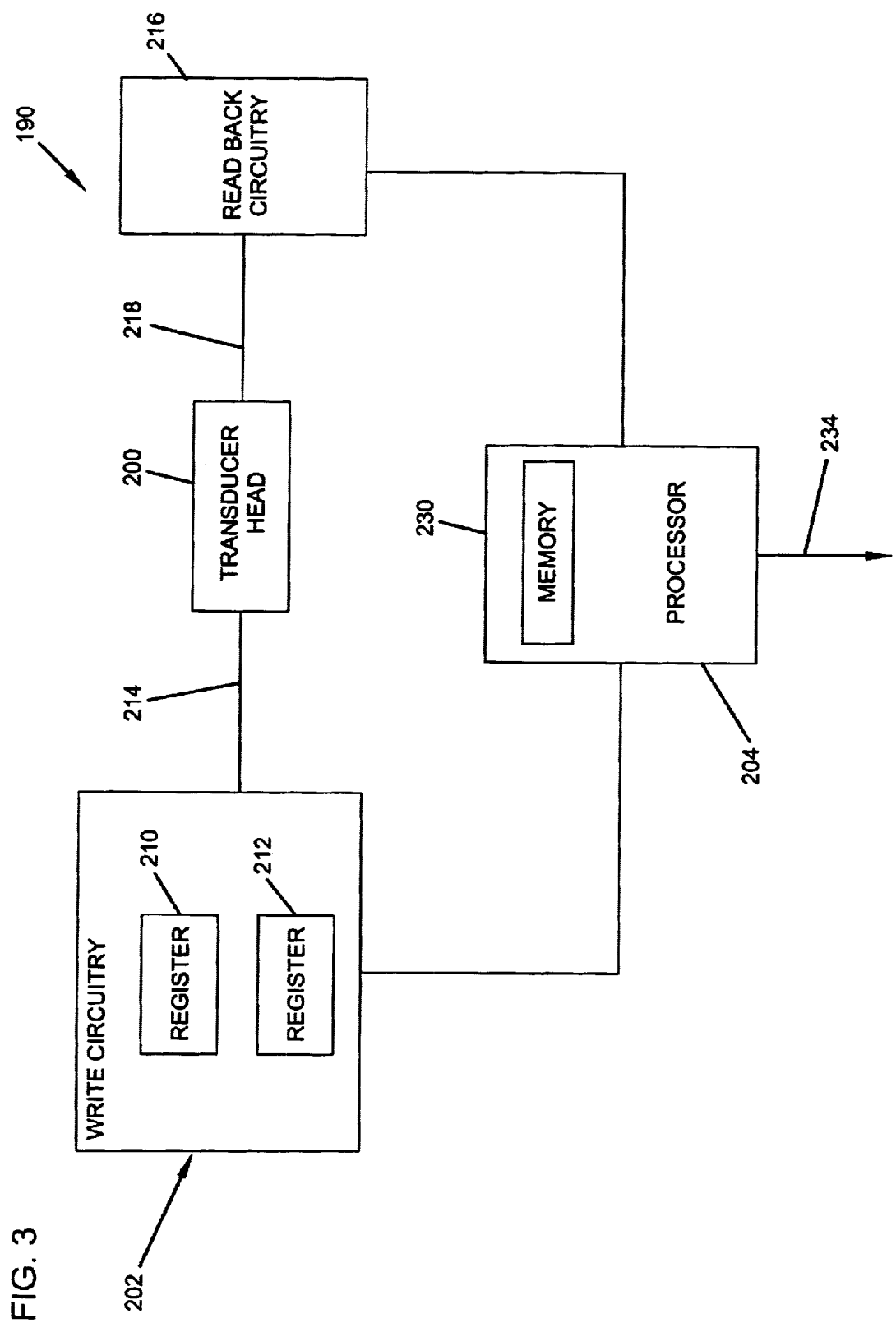
FIG. 3 is a simplified block diagram showing test circuitry of the present invention.

FIG. 3 is a block diagram of diagnostic circuitry 190 for use in testing a transducer head 200 in accordance with one embodiment of the present invention. Transducer head 200 is carried on slider 110 shown in FIG. 1. In FIG. 3, write circuitry 202 is coupled to a processor 204 and receives data and control signals for use in writing information onto the storage medium provided by disc pack 106 shown in FIG. 1 using transducer head 200. Write circuitry 202 includes a write current control register 210 and an overshoot control register 212 which are used to adjust the write current level and the overshoot level, respectively, in a write signal 214 which is applied to transducer head 200. The write current refers to the amount of electrical current applied to the transducer head 200 when writing information onto the storage medium. Overshoot amount refers to an initial overshoot when the write current is applied to the transducer head. This is shown below in FIG. 4.

Read back circuitry 216 receives a read back signal 218 from transducer head 200. Read back circuitry 216 is used when reading data back from the storage medium and provides the read back data to processor 204. Processor 204 operates in accordance with instructions stored in memory 230. Processor 204 provides an output 234 which is an indication of the presence of voids in head 200. Processor 204 can be located internally or externally to disc drive 100.

Figure 4:
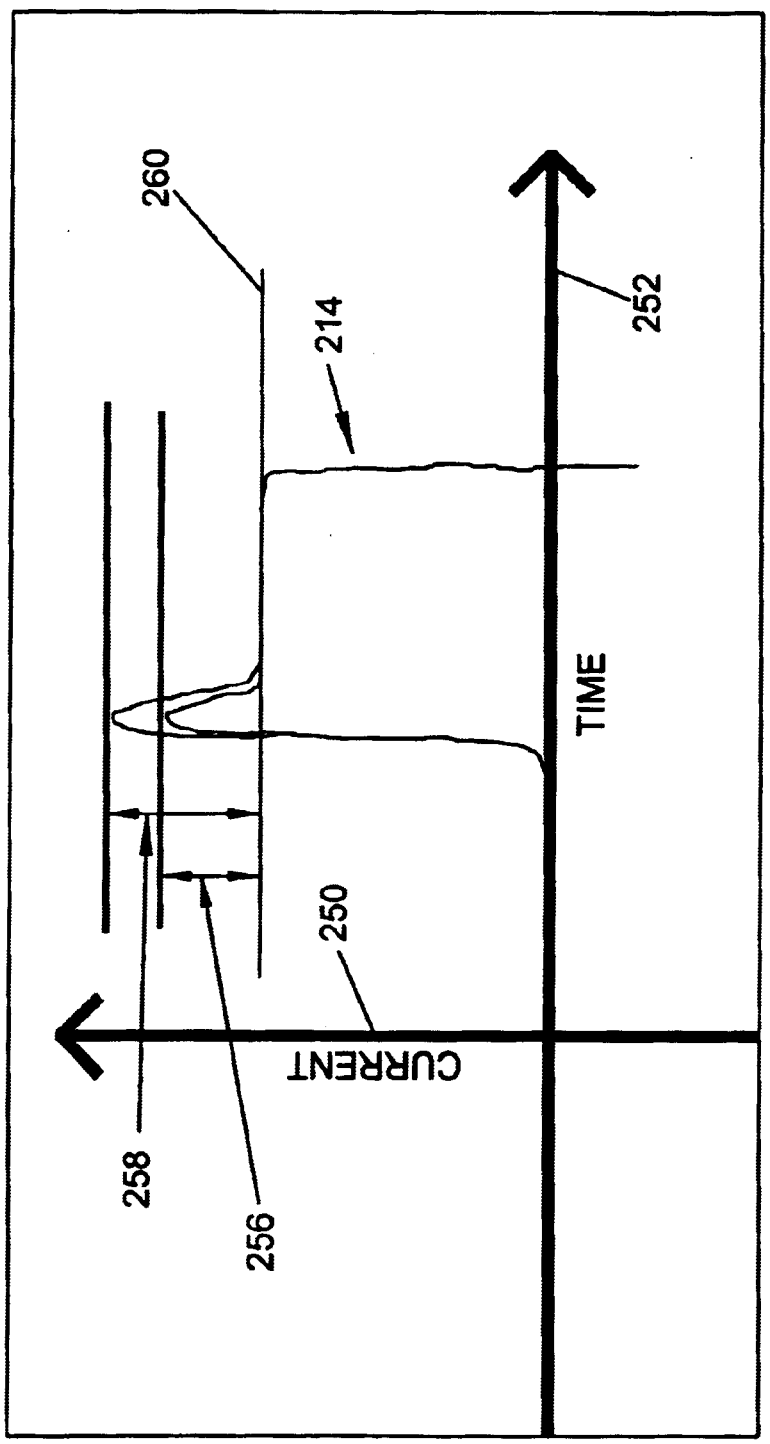
FIG. 4 is a graph of write current vs. time which illustrates write current level and overshoot amount.

FIG. 4 is a graph showing current 250 versus time 252 for write signal 214 applied to transducer head 200 shown in FIG. 3. FIG. 4 illustrates a minimum overshoot amount 256, maximum overshoot amount 258 and a write current level 260. The overshoot amount and the write current level is controlled at 210 and 212 in write circuitry 202 by processor 204.

Figure 5:
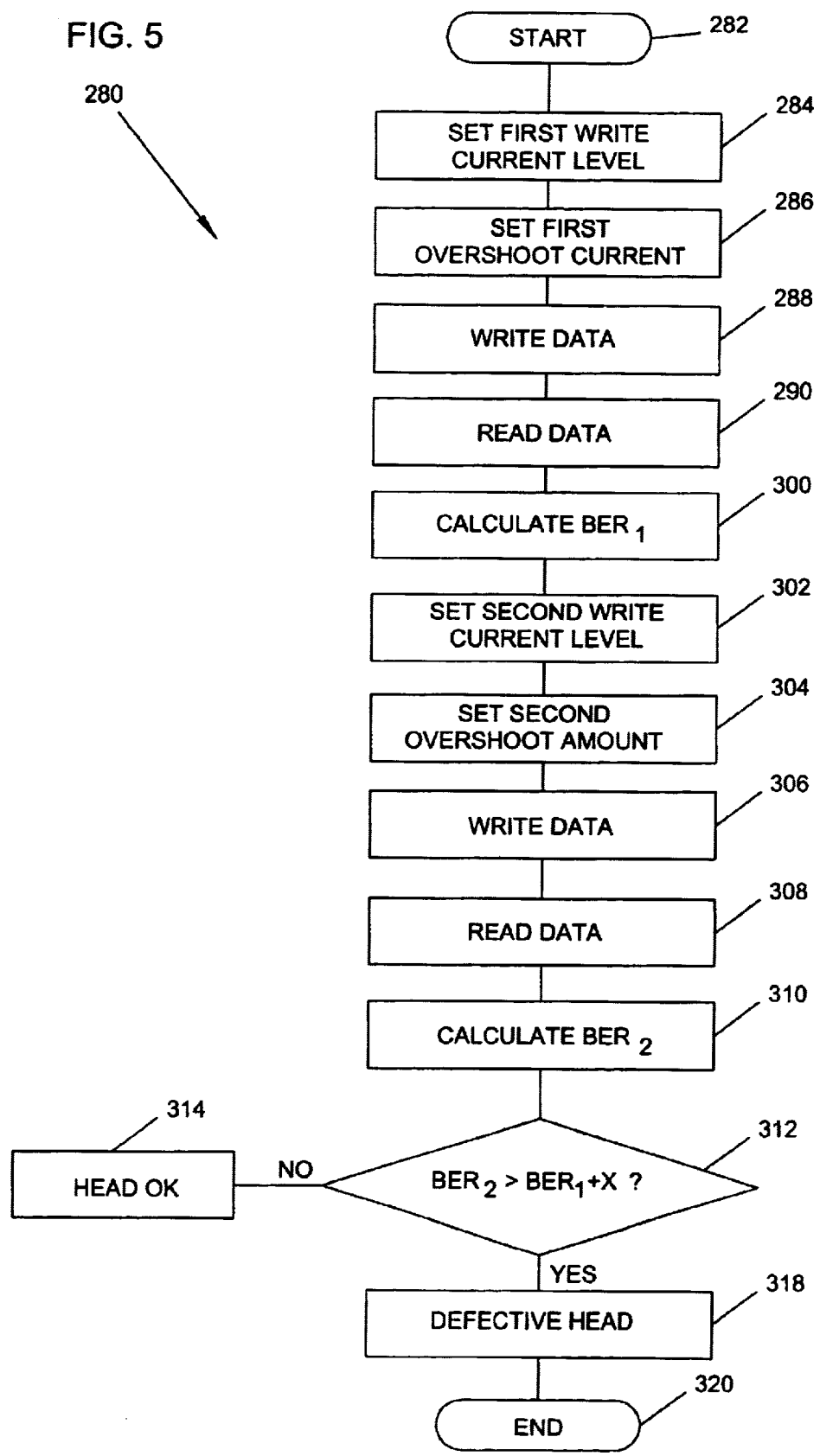
FIG. 5 is a block diagram illustrating steps of the present invention.

FIG. 5 is a simplified block diagram 280 showing steps performed by processor 204 in accordance with instructions stored in memory 230. In one embodiment, the steps set forth in block diagram 280 are performed manually, without the use of an automated processor 204. The various steps set forth in block diagram 280 do not need to be carried out in the particular order shown. Some of the steps can occur in a different order or may be performed in parallel and do not need to be performed sequentially as illustrated. This is also true for the steps set forth in the claims which follow unless otherwise noted.

At block 282 the process is initiated and control is passed to block 284 where a first write current level is set by controlling write current level 210 in write circuitry 202 shown in FIG. 3. The first write current level can be a default or tuned value. At block 286, a first write overshoot amount is set with overshoot amount 212 in write circuitry 202. Data is written onto the storage medium at block 288 using transducer head 200 and the first write current level and first overshoot amount set in steps 284 and 286, respectively. The written data is read back at block 290 and a first bit error rate ($BER_1$) is calculated at block 300 as a ratio between the errors read back and the total number of bits. At blocks 302 and 304, a second write current level and a second overshoot amount are set, respectively. The second write current level can be the same as, more than or less than the first write current level and the second overshoot amount is less than the first overshoot amount. At block 306 data is written at the write current level and overshoot amounts set at steps 302 and 304 respectively. At block 308 the written data is read back from the media and a second bit error ($BER_2$) is calculated at block 310.

At block 312 the second bit error rate is compared to the first bit error rate. If the second bit error rate is less than the first bit error rate, plus an adjustable offset amount X, control is passed to block 314 and the transducer head under test is determined to be operating within acceptable parameters. On the other hand, if the second bit error rate is less than the first bit error rate plus the offset, control is passed to block 318 and the transducer head under test is identified as being defective. Control is passed to block 320 and the process is terminated. In one specific example, X is 2.5 dB, however, an appropriate value, including a negative value, can be chosen as desired. Note that if a smaller overshoot amount is used at step 286, and a larger overshoot amount at step 302, the comparison at step 312 can be reversed.

The first and second write current levels and the first and second overshoot amounts as well as the offset valve X should be adjusted for a particular type of transducer head in the particular electronics being used for reading and writing data. In one simple embodiment, the first and second overshoot amounts are the maximum and minimum amounts, that write circuitry 202 is capable of writing. The values of the write current levels, overshoot amounts and X can be determined by experimentation and are preferably set such that substantially all of the "void" heads which would cause errors during operation, are discarded without discarding those heads which would operate acceptably.

Preferably, the test is carried out over a band of data tracks around a storage disk. However, aisle or spaced apart tracks, can be used. The band of tracks can range from one track upwards to, for example, twenty tracks. Preferably the same band of tracks is used for determining both the first and second bit error rates. Further, the band of tracks are preferably on the outer diameter of the disk because this provides the highest bit depth density and is more apt to show the symptoms associated with a void head. In one example, the test is performed at 42° C. Any appropriate data pattern can be used.

A method is provided for identifying damaged magnetic transducer heads 200 during the manufacture of a magnetic disc storage system. A write current is set to a first level (284), an overshoot amount is set to a first amount (286) and a first bit error rate is calculated by writing and reading back data (288, 290 and 300). The write current is set to a second level and the overshoot amount is set to a second amount (302 and 304). A second bit error rate is calculated by writing and reading back data (306, 308 and 310). A defective head is identified by comparing the first bit error rate to the second bit error rate (312, 314 and 318). In various aspects, the first and second write current levels are the same and the first and second overshoot amounts are different. The writing and reading can occur on a band of data tracks by a magnetic storage disc 106. An apparatus includes write circuitry 202 configured to couple to a transducer head 200 and apply a write signal at a write current level 210 and an overshoot amount 212. Read back circuitry 216 reads back written data using transducer head 200. A processor 204 calculates first and second bit error rates based upon data written at first and second overshoot amounts and identifies a damaged transducer head based upon a comparison of the first and second bit error rates.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements steps and order of the steps may vary depending on the particular application for the transducer head test system while maintaining substantially the same functionality without departing from the scope and spirit of the present invention.

What is claimed is:

1. A method of identifying damaged magnetic transducer heads during the manufacture of magnetic disc storage systems, comprising:

(a) setting a write current to a first level, setting an overshoot amount to a first amount, writing data to a magnetic storage disc using a magnetic transducer head under test at the first write current level and the first overshoot amount;

(b) reading back the data written in step (a);

(c) calculating a first bit error rate based upon steps (a) and (b);

(d) setting the write current to a second level, setting the overshoot amount to a second amount which is different from the first overshoot amount, writing data to the magnetic disc using the magnetic head under test at the second write current level and the second overshoot amount;

(e) reading back the data written in step (d);

(f) calculating a second bit error rate based upon steps (d) and (e); and (g) determining if the transducer head under test is physically damaged based upon a comparison of the first bit error rate to the second bit error rate.

2. The method of claim 1 wherein the second write current level is the same as the first write current level.

3. The method of claim 1 wherein the second overshoot amount is less than the first overshoot amount and the transducer head is determined to be physically damaged if the second bit error rate is more than the first bit error rate plus an offset factor.

4. The method of claim 1 wherein the writing data and reading back of data set forth in steps a, b, d and e are performed on a band of data tracks on a magnetic storage disk.

5. The method of claim 4 wherein the band of tracks comprises at least one data track.

6. The method of claim 4 wherein the same band of tracks is used for each of steps a, b, d and e.

7. The method of claim 1 wherein the writing data and reading back data of steps a, b, d, and e are performed proximate an outer diameter of a magnetic storage disk.

8. An diagnostic device configured to implement the method of claim 1.

9. An apparatus for identifying damaged magnetic transducer heads during the manufacture of magnetic disk storage systems, comprising:

write circuitry configured to couple to a transducer head and provide a write signal to the transducer head at a write current level and a settable overshoot amount;

read back circuitry configured to couple to the transducer head to read back data;

a processor configured to couple to the write circuitry and the read circuitry and configured to calculate a first bit error rate based upon data written at a first current level and a first overshoot amount and a second bit error rate based upon data written at a second current level and a second overshoot amount and responsively identify a damaged transducer head based upon a comparison of the first bit error rate and the second bit error rate wherein the first and second overshoot amount are different.

10. The apparatus of claim 9 wherein the second write current level is the same as the first write current level.

11. The apparatus of claim 9 wherein the second overshoot amount is less than the first overshoot amount and the transducer head is determined to be physically damaged if the second bit error rate is more than the first bit error rate plus an offset factor.

12. The apparatus of claim 9 wherein the data is written and read from a band of data tracks on a magnetic storage disk.

13. The apparatus of claim 12 wherein the band of tracks comprises at least one data track.

14. The apparatus of claim 12 wherein the same band of tracks is used for determining the first bit error rate and the second bit error rate.

15. The apparatus of claim 9 wherein the data is written and read from an outer diameter of a magnetic storage disk.

16. An apparatus for identifying damaged magnetic transducer heads during the manufacture of magnetic disk storage systems, comprising:

means for providing a write signal to a transducer head at a write current level and a settable overshoot amount;

means for reading back data from the transducer head;

means for calculating a first bit error rate based upon data written at a first current level and a first overshoot amount and a second bit error rate based upon data written at a second current level and a second overshoot amount and identifying a damaged transducer head by comparing the first bit error rate and the second bit error rate wherein the first and second overshoot amount are different.

17. The apparatus of claim 16 wherein the second write current level is the same as the first write current level.

18. The apparatus of claim 16 wherein the second overshoot amount is less than the first overshoot amount and the transducer head is determined to be physically damaged if the second bit error rate is more than the first bit error rate plus an offset factor.

19. The apparatus of claim 16 wherein the data is written and read from a band of data tracks on a magnetic storage disk.

20. The apparatus of claim 19 wherein the band of tracks comprises at least one data track.

21. The apparatus of claim 19 wherein the same band of tracks is used for determining the first bit error rate and the second bit error rate.

22. The apparatus of claim 16 wherein the data is written and read from an outer diameter of a magnetic storage disk.

* * * * *

UNITED STATES PATENT AND TRADEMARK OFFICE
CERTIFICATE OF CORRECTION

PATENT NO.    : 6,696,832 B2                                           Page 1 of 1
DATED         : February 24, 2004
INVENTOR(S)   : Victor W. K. Chew et al.

It is certified that error appears in the above-identified patent and that said Letters Patent is hereby corrected as shown below:

Column 4,
Line 23, delete "valve" and insert -- value --.

Signed and Sealed this

Fourteenth Day of September, 2004

JON W. DUDAS
*Director of the United States Patent and Trademark Office*